United States Patent [19]

Kähkipuro

[11] 4,393,442

[45] Jul. 12, 1983

[54] PROCEDURE AND MEANS FOR MONITORING CURRENT DATA IN A THYRISTOR-CONTROLLED DIRECT CURRENT DRIVE

[75] Inventor: Matti Kähkipuro, Hyvinkää, Finland

[73] Assignee: Elevator GmbH, Barr, Switzerland

[21] Appl. No.: 218,767

[22] Filed: Dec. 22, 1980

[30] Foreign Application Priority Data

Dec. 28, 1979 [FI] Finland .................................. 794076

[51] Int. Cl.³ ............................................. H02M 7/17
[52] U.S. Cl. ....................................... 363/70; 363/87; 318/801
[58] Field of Search ............... 318/293, 762, 763, 800, 318/801; 363/70, 87, 159, 160, 161, 162; 361/28, 29

[56] References Cited

U.S. PATENT DOCUMENTS

| | | | |
|---|---|---|---|
| 3,320,514 | 5/1967 | Lawrence | 363/162 |
| 3,588,668 | 6/1971 | Cova | 363/162 |
| 3,713,012 | 1/1973 | Johnson | 363/70 |
| 3,996,499 | 12/1976 | Gary et al. | 361/29 |
| 4,056,767 | 11/1977 | Tobise et al. | 363/63 X |

*Primary Examiner*—William M. Shoop
*Attorney, Agent, or Firm*—Martin Smolowitz

[57] ABSTRACT

A method and apparatus for monitoring current data in a thyristor-controlled direct current drive, the drive system comprising two thyristor bridges converting alternating current into direct current for the drive motor and a current measuring unit. With the aid of a current controller the drive system is caused to operate in one of two different modes of operation, so that as the system approaches zero current condition, the normal mode of operation changes to an oscillating mode, the direct current circuit being monitored with the aid of a delayed current indicator datum in the zero current situation as well.

4 Claims, 6 Drawing Figures

PROCEDURE AND MEANS FOR MONITORING CURRENT DATA IN A THYRISTOR-CONTROLLED DIRECT CURRENT DRIVE

BACKGROUND OF INVENTION

The present invention relates to a procedure apparatus for monitoring the current data in a thyristor-controlled d.c. elevator drive, the operating system of the invention comprising two thyristor bridges converting alternating current into direct current for the drive motor, and a current measuring unit.

The elevator may be in zero-current state in one of two cases, namely, when there is a fault in the operating system or when the load imposed causes a normal, transient zero-current state. It is difficult to distinguish between these two states. As a result, a dangerous situation is caused to those using the elevator and, in particular, also to the personnel servicing and repairing the elevator. Therefore, in some countries the elevator regulations in fact demand monitoring of the d.c. circuit. It has however been difficult, as a rule, owing to the said reason to arrange for the monitoring of current because it is not possible to observe whether the motor is or is not supplied with current. After the developing of semiconductors to replace earlier types of equipment, new needs have arisen in the current monitoring systems. By virtue of their advantageousness, thyristors have in ever more numerous instances replaced the dynamotor current converters. Thyristor drives work with a considerably better efficiency, and therefore the operating costs are better. The manufacturing costs likewise are reduced from those of rotary converters. But certain new detriments have also appeared in these drive systems. It is a frequent event in a normal elevator operation that the usual situation exists wherein the drive motor moves the elevator car and therefore requires current is in fact inverted in that by effect of the loading of the elevator, of the direction in which it moves and of its speed the elevator car "pulls" the drive motor. The drive motor will then operate as a generator and it will supply current to the mains network instead of drawing current therefrom. In such situations the current is reversed and, due to the nature of the drive systems, the system remains for a moment in a complete zero-current state at the time of change. The duration of the zero-current state varies and it has not been possible by known techniques to determine its length exactly. Measurement of current could not be applied in any satisfactory way because emergency stops would occur altogether too frequently and without cause at current reversals in the system.

In a procedure of prior art, a fuse was connected in the circuit between the thyristor bridges and the drive motor. This fuse is monitored with the aid of an optoisolator so that when the fuse goes the optoisolator transmits the information that the supply of current to the motor is interrupted. Emergency stop is actuated on the strength of this information. This system has the drawback that one is only able to monitor current supply trouble due to failure of the fuse. If the current is interrupted for any other reason, the system is insensitive to the event as regards the monitoring operations.

SUMMARY OF INVENTION

The object of the present invention is to eliminate the drawbacks mentioned. Another object is to provide a current monitoring arrangement which is reliable and inexpensive and in these respects meet the elevator regulations in force in various countries. The invention is characterized in that with the aid of a current controller, the drive system operates in two different modes, so that as the system approaches the zero-current state, the normal mode of operation changes over to an oscillating mode, in which situation, with the aid of delayed current indicator data, the direct current circuit is monitored in the zero current situation as well. The procedure has the advantage that it is easy to operate and, therefore, reliable and inexpensive. It has a further advantage that by this procedure, one is able to monitor interruptions of current resulting from any conceivable cause and, subsequently, to take proper steps.

The procedure of the inventive embodiment is characterized in that, in the event of an electrical failure the delayed current indicator data turns from positive to negative, or vice versa, and an emergency stop is actuated. The advantage is the simplicity of the monitoring system.

The invention also concerns itself with means for carrying out a monitoring arrangement according to the procedure. The means comprises an operational amplifier for producing the current indicator data. The means of the invention is characterized in that the output information of the operational amplifier connected to the current controller—that is, the current indicator data—is delayed with the aid of a delay circuit, whereupon the delayed current indicator data goes to an emergency stop circuit which actuates the emergency stop when this becomes necessary.

The means of the invention is also characterized in that the delay circuit consists of a diode connected to the operator amplifier and of a resistor and capacitor connected in parallel between this diode and the ground, and of a resistor connected between the delay circuit and the emegency stop circuit. A delay circuit of this kind is simple and reliable in operation.

The invention is described more closely in the following with the aid of an example and with reference being made to the attached drawings, wherein:

DESCRIPTION OF INVENTION

Figure 1:
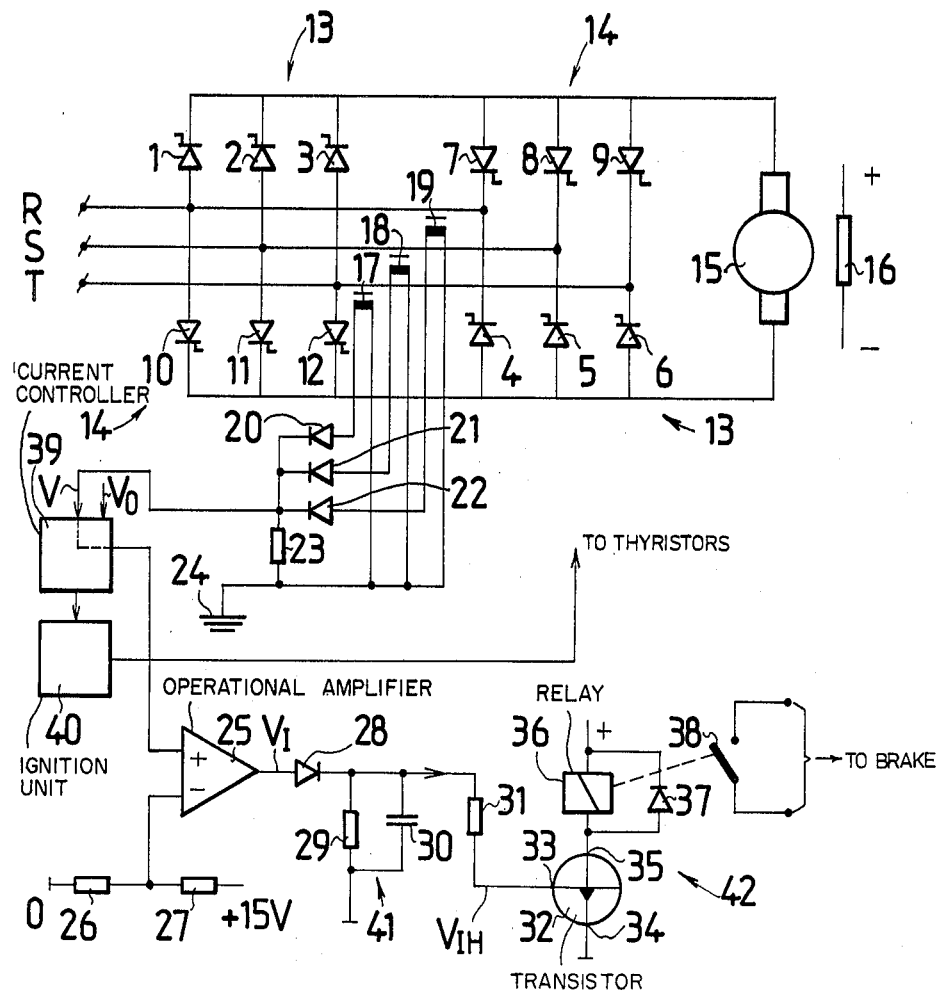
FIG. 1 is a schematic diagram with the most essential components of the power section of a static current converter, and the emergency stop circuit associated with this power section.

FIG. 1 shows the essential components of the static converter power section and the current controller 39 and ignition unit 40 associated with the power section, these having been presented in the form of block diagrams only, in the interest of clarity.

Three phase A.C. is applied to points R,S, and T per FIG. 1, to inputs of thyristor bridges 13 and 14, comprising respectively thyristors 1–6 and 7–12. Current sensing transformers (17–19) are connected across the three A.C. phases. The output of transformers (17–19) is fed into diodes (20–22) and terminated across resistor 23 feeding V input on current controller 39. The rectified voltage is always positive.

Input $V_o$ to current controller 39 will set the operating limits of the control circuit, opening and closing the cridge.

This voltage in turn is directed to the V input of the current controller 39. The output voltage of the controller responds as follows: if the voltage is +10 volts, thyristor bridge 13 will ignite; when the voltage is at −10 volts, the bridge 14 will ignite; when the voltage approaches zero, the bridges have zero output current.

Figure 2:
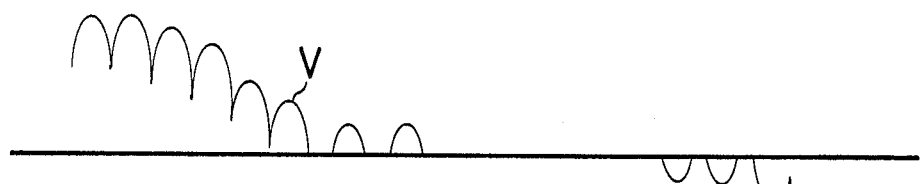
FIG. 2 shows a current graph obtained from a conventional current converter operating with thyristor bridges.
Figure 3:
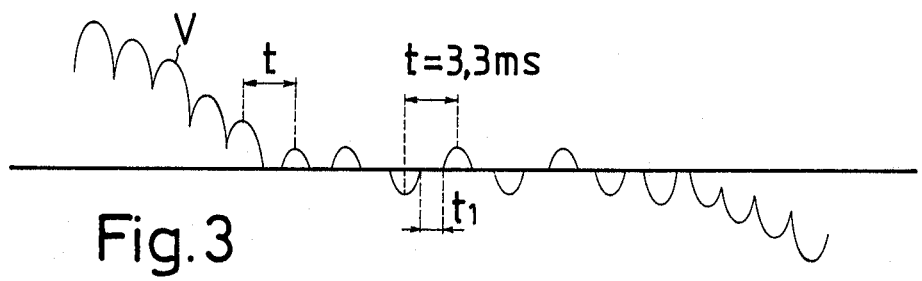
FIG. 3 shows the current graph of the current converter of the invention.
Figure 4:
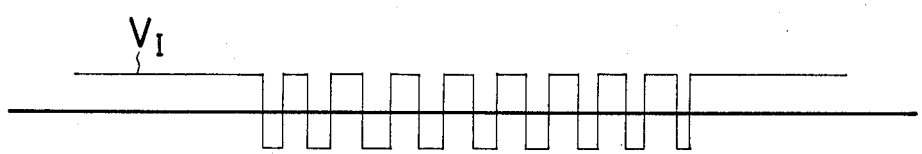
FIG. 4 shows the current indicator graph in the apparatus of the invention.
Figure 5:
FIG. 5 shows the delayed current indicator graph in the same apparatus.
Figure 6:
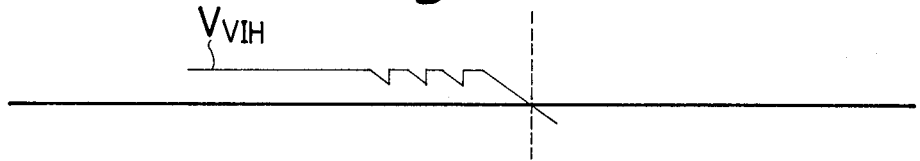
FIG. 6 shows the current indicator graph in a situation in which emergency stop is actuated at the point indicated by the dotted line.

The igniter unit 40 operates in conventional mode, with igniter circuit outputs firing at proper time sequence in response to switching pulses (±10 volts at 3 ms). Outputs of the two thyristor bridges are applied to the D.C. motor serving as a load. The design and operation of the current controller. The power section comprises two thyristor bridges, the first of these 13 comprising the thyristors 1–6 and the second thyristor bridge 14, the thyristors 7–12. Furthermore, the power section comprises a current measuring unit, comprising the current transformers 17–19, diodes 20–22 and resistor 23. The terminal 24 has been provided for ground connection. Still further, the power section comprises the d.c. motor 15 and its magnitizing winding 16. The current controller 39 receives the current present value datum V and the current nominal value datum $V_o$. The current indicator datum $V_I$ is formed from the current present value datum V by the aid of the operational amplifier 25 and the resistances 26 and 27. In principle, the current indicator datum $V_I$ is present in the circuit in the manner shown by FIG. 4 and at the frequency determined by the current present value datum V of FIG. 3. Always when current is present in the circuit, the current indicator datum $V_I$ is positive, regardless of the sign of the current present value datum V. When there is no current, $V_I$ is negative. The present invention is rendered possible by the circumstance that the system is placed, instead of the normal mode of operation, into a so-called oscillating mode of operation whenever as a result of external circumstances the current present value datum V approaches the zero condition. In the oscillating mode, the current present value datum changes sign at the mains frequency, so that no completely zero current state can ensue, as it can in the conventional system of FIG. 2. The present invention is based on the delaying of the current indicator datum $V_I$ by means of the delay circuit 41 composed of the diode 28, resistor 29 and capacitor 30, so that during a time $t_1$, which is a brief zero-current period between mains cycles, the delayed current indicator datum $V_{IH}$ has not time to change sign from positive to negative. With mains frequency 50 Hz there is $t=3.3$ milliseconds, and $t_1$ is much smaller than this. In that case the appropriate time constant of the delay circuit 41 will be e.g. 3.0 ms. The delayed current indicator datum $V_{IH}$ is now further conducted through the resistor 31 to the emergency stop circuit 41. The task of the resistor 31 is to prevent overloading of the operator amplifier 25.

The delayed current indicator datum $V_{IH}$ goes to the emergency stop circuit 42 over the base 33 of transistor 32. The emitter 34 of the transistor is grounded, and the collector 35 has been connected to a current-supplying circuit consisting of the mutually parallel-connected diode 37 (or over-voltage guard) and relay 36, the contact bank of the latter being indicated with reference numeral 38. In normal operation of the system, i.e. when the transistor base 33 receives the positive delayed current indicator datum VIH, transistor 32 is conductive and the relay contact 38 is closed, whereby the electric current energizing the brake keeps the brake released, and the lift begins to move. If then a true current failure occurs in the system for any reason, the delay circuit 41 is no longer sufficient to maintain the delayed current indicator datum $V_{IH}$ at a positive value, and VIH changes sign. The transistor base 33 then receives a negative current datum, and the transistor ceases to conduct. The contact of relay 38 will then open, the brake current ceases to flow and the spring force actuates the brake. In such instance therefore so-called emergency braking will take place.

It is obvious to a person skilled in the art that the invention is not exclusively confined to the example here presented, and that different embodiments of the invention may differ within the scope of the claims following below.

I claim:

1. A method of monitoring current data in a thyristor controlled direct current drive circuit, comprising the steps of: applying three phase A.C. current to terminals R, S, T connected to inputs of a pair of parallel thyristor bridges; applying a D.C. current output to a D.C. motor electrically in circuit as a load; applying A.C. current to current sensing transformers in parallel relation to thyristor bridge inputs connected to three rectifying diodes and having D.C. output terminated across a resistor; feeding rectified A.C. to a current controller connected to an igniter unit, causing said igniter unit to fire said thyristors in proper timing sequence through action of said igniter unit, whereby the output D.C. current of said thyristor bridges exhibit proper amplitude and polarity, causing said D.C. motor to operate; feeding voltage generated across said resistor to an operational amplifier and feeding its output to a time delay circuit; directing the output voltage of said delay circuit to an emergency stop circuit, employing a relay having associated contacts responsive to said output voltage, whereby, a zero voltage condition in excess of a predetermined time, energizes said relay causing said contacts to close and indicate a stop condition.

2. A method as claimed in claim 1, including the steps of: operating said motor in one of two different modes, producing an oscillating mode as a normal mode in response to a zero current condition, and monitoring said direct current circuit in a zero current condition by circuit means defined by said operational amplifier, time delay circuit and relay.

3. An apparatus for monitoring current data for a thyristor controlled direct current circuit, comprising: two thyristor bridges connected in parallel for receiving a source of A.C. current; current sensing transformers connected in parallel to said thyristor bridges receiving A.C. current; associated rectifying diodes connected to inputs of said thyristor bridges, having D.C. output terminated across a resistor; a current controller for receiving rectified A.C. and being connected to an igniter unit; said igniter unit having output fed to said thyristor bridges permitting ignition of control gates in proper sequence, whereby, a direct current motor in circuit relation to said thyristor bridges is driven in response thereto; an operational amplifier employed as a voltage comparator for receiving voltage across said resistor, said operational amplifier being in circuit relation to a time delay circuit for delaying the output of said operational amplifier, said time delay circuit having its output voltage fed to an emergency stop circuit; said emergency stop circuit having a relay and associated contacts responsive to said output voltage and whereby zero voltage condition in excess of a predetermined time, energizes said relay, closing said contacts, thus indicating a stop condition.

4. An apparatus as claimed in claim 3, wherein: the delay circuit comprises a diode connected to the operational amplifier and a resistor and capacitor connected between said diode and ground, and a resistor connected between the delay circuit and the emergency stop circuit.

* * * * *